US005997994A

United States Patent [19]

Matsushima

[11] Patent Number: 5,997,994

[45] Date of Patent: Dec. 7, 1999

[54] PRESSURE-SENSITIVE TRANSFER CORRECTION TAPE

[75] Inventor: Kojiro Matsushima, Urawa, Japan

[73] Assignee: Tombow Pencil Co., Ltd., Tokyo, Japan

[21] Appl. No.: 09/177,967

[22] Filed: Oct. 26, 1998

[30] Foreign Application Priority Data

Jun. 10, 1998 [JP] Japan .................................. 10-162476

[51] Int. Cl.[6] ........................................................ B32B 3/00

[52] U.S. Cl. .......................... 428/195; 428/220; 428/354; 428/213; 428/214

[58] Field of Search .................................... 428/220, 354, 428/914, 195, 202, 214, 213

[56] References Cited

U.S. PATENT DOCUMENTS

| | | | |
|---|---|---|---|
| 4,891,260 | 1/1990 | Kunkel et al. | 428/220 |
| 5,135,798 | 8/1992 | Muschter et al. | 428/202 |
| 5,221,577 | 6/1993 | Inaba et al. | 428/354 |
| 5,242,725 | 9/1993 | Weissmann et al. | 428/40 |
| 5,409,753 | 4/1995 | Perez | 428/40 |
| 5,547,738 | 8/1996 | Mitchell et al. | 428/195 |
| 5,693,394 | 12/1997 | Nagai et al. | 428/42.1 |
| 5,698,301 | 12/1997 | Yonetani | 428/213 |
| 5,700,552 | 12/1997 | Katsuro et al. | 428/214 |
| 5,711,124 | 1/1998 | Stough et al. | 52/417 |
| 5,811,174 | 9/1998 | Murakami | 428/195 |

FOREIGN PATENT DOCUMENTS

| | | |
|---|---|---|
| 0 318 804 B1 | 4/1994 | European Pat. Off. . |
| 0 410 248 B1 | 12/1994 | European Pat. Off. . |
| 37 41 022 C2 | 6/1989 | Germany . |
| 38 35 738 A1 | 4/1990 | Germany . |
| 39 25 130 A1 | 1/1991 | Germany . |

*Primary Examiner*—William Krynski
*Assistant Examiner*—Betelhem Shewareged
*Attorney, Agent, or Firm*—Griffin, Butler, Whisenhunt & Szipl, LLP

[57] ABSTRACT

The object of the present invention is to provide a pressure-sensitive correction tape having concealing properties and improvements in deterioration with time in an adhesive layer while not causing any blocking phenomenon and being excellent transfer cutting properties. The present invention relates to a pressure-sensitive transfer correction tape comprising a correction concealing layer on one side of a sheet substrate and a pressure-sensitive adhesive layer provided thereon containing a concealing material wherein the thickness in total of the pressure-sensitive adhesive layer and the correction concealing layer is 50 $\mu$m or less and the ratio in thickness of the pressure-sensitive adhesive layer and the correction concealing layer is in the range of 1:1 to 1:4.

5 Claims, No Drawings

PRESSURE-SENSITIVE TRANSFER CORRECTION TAPE

FIELD OF THE INVENTION

The present invention relates to a pressure-sensitive transfer correction tape and in particular to a pressure-sensitive transfer correction tape being excellent in concealing properties, having improvements in deterioration with time of an adhesive layer and being excellent in transfer cutting properties not causing any blocking phenomenon.

BACKGROUND OF THE INVENTION

Recently, a pressure-sensitive transfer correction tape for correcting hardly erasable characters etc. recorded erroneously on a paper etc. is conveniently used. The pressure-sensitive transfer correction tape is constructed essentially of (1) a white correction concealing layer consisting of a white pigment and a resin on a sheet substrate and (2) a pressure-sensitive adhesive layer provided thereon to be transferred to a material to be corrected, and this tape is called "correction tape" and conventionally known.

This pressure-sensitive transfer correction tape is wound on a reel and fitted and kept in a transfer holder. For use, the pressure-sensitive transfer correction tape from the transfer hold is pushed against a material to be corrected, and while the tape is pressed strongly thereon, the holder is pulled and lifted from the correction termination site whereby the pressure-sensitive adhesive layer and the white correction concealing layer are cut off and the correction tape is uniformly transferred to the correction site to complete the correction. Desirably, this correction tape can be immediately written with writing instruments such as ball-point pens etc.

However, in the case of the pressure-sensitive transfer correction tape fitted on a conventional transfer holder, the releasability of the pressure-sensitive transfer correction tape from the substrate is poor at the time of transfer correction, so that uniform transfer is not feasible, that is, a blocking phenomenon occurs, and thus there is the problem that the correction site cannot completely be concealed or unwinding of the tape from the transfer holder becomes difficult, thus causing running failures etc.

For the purpose of preventing this blocking phenomenon, a pressure-sensitive correction adhesive tape described in e.g. Japanese Patent Appln. Laid-Open Publication No. 276695/1996 has been proposed. This pressure-sensitive correction tape comprises a pressure-sensitive layer on a concealing layer provided on a substrate wherein the pressure-sensitive adhesive layer is as very thin as 0.8 to 1.6 μm and the ratio in thickness of the pressure-sensitive adhesive layer and the correction concealing layer is in the range of 1:14 to 1:35. However, because the pressure-sensitive layer is a thin film, there are cases where its adhesion at the time of transfer is weak and transfer failures and the blocking phenomenon still have not completely been solved.

The pressure-sensitive adhesive tape proposed in Japanese Patent Publication No. 49476/1993 is free of transfer failures because its pressure-sensitive adhesive layer is a relatively thick film, but it is inferior in concealing properties and the pressure-sensitive layer is also deteriorated in the course of time to cause discoloration of the concealing layer, so it cannot be satisfactory as a correction tape.

Accordingly, the present inventors have previously proposed a pressure-sensitive transfer correction tape comprising a correction concealing layer on one side of a sheet substrate and a silicon high-performance powder with an average diameter of 1 to 10 μm provided on said correction concealing layer wherein the ratio in thickness of the pressure-sensitive adhesive layer and the correction concealing layer is 1:1 to 1:4 (Japanese Patent Application No. 90561/1998). By using a ratio in thickness of the pressure-sensitive adhesive layer and the correction concealing layer in the range of 1:1 to 1:4, the releasability of the pressure-sensitive transfer correction tape from the substrate and the cutting properties at the time of transfer are improved and the desired product can thereby be obtained. However, the present inventors have conducted an examination to further improve the concealing properties of this product to make it a more superior product.

Usually, a continuous pressure-sensitive transfer adhesive tape is wound on a transfer holder consisting of a cylindrical core, and the thickness in total of the pressure-sensitive adhesive layer and the correction concealing layer is preferably 20 to 50 μm or so. If the total thickness exceeds 50 μm, there are the problem that the size of the core with these layers wound thereon is larger and cannot be accommodated in a compact case, or its transfer cutting properties are worsened. Under these circumstances, if the concealing layer is made thicker to improve concealing properties, the adhesive layer should be made thinner, resulting in occurrence of the blocking phenomenon and transfer failures. Further, if the pressure-sensitive adhesive layer is made thicker to improve transfer properties, the concealing layer should be made thinner, resulting in making concealing properties inferior since the pressure-sensitive adhesive layer is transparent, and furthermore, cutting properties at the time of transfer are poor and the adhesive layer is also easily deteriorated in the course of time, so the desired object cannot be achieved.

SUMMARY OF THE INVENTION

Accordingly, the present inventors have made extensive studies for improvements in concealing properties without reducing transfer properties and cutting properties at the time of transfer. As a result, the present inventors have found that by incorporation of a concealing improver into the pressure-sensitive adhesive layer, it is possible to not only improve both concealing and cutting properties but also prevent the adhesive from being deteriorated in the course of time, to complete the present invention. The object of the present invention is to provide a pressure-sensitive transfer correction tape excellent in concealing properties, transfer properties and cutting properties.

That is, the present invention relates to a pressure-sensitive transfer correction tape comprising a correction concealing layer on one side of a sheet substrate and a pressure-sensitive adhesive layer provided thereon containing a concealing material wherein the thickness in total of the pressure-sensitive adhesive layer and the correction concealing layer is 50 μm or less and the ratio in thickness of the pressure-sensitive adhesive layer and the correction concealing layer is in the range of 1:1 to 1:4. The concealing material is preferably titanium oxide particularly having an average diameter of 5 μm or less.

DETAILED DESCRIPTION OF THE INVENTION

The substrate used in the present invention may be any plastic substrate or paper substrate, and the plastic substrate is preferably e.g. polyester films such as polyethylene terephthalate and polyolefin films such as polypropylene film and polyethylene film. These substrates are preferably those having a releasing agent coated thereon or incorporated therein.

The adhesive, which is applied to this substrate to form the pressure-sensitive layer, can be any adhesive of rubber type, acrylic resin type, rosin type and silicone type, but the acrylic resin type adhesive is preferably used.

In the present invention, this adhesive is dissolved or dispersed in a solvent in which a concealing material is then suspended. The solvent may be an organic solvent or an aqueous solvent. The concealing material includes titanium oxide, calcium carbonate, magnesium carbonate, magnesium silicate, polystyrene, silicon dioxide, alumina silicate, polymethacrylate etc., among which titanium oxide is particularly preferable and its average diameter is preferably 5 μm or less. A concealing material of 5 μm or more in diameter cannot be suspended and the thickness of its layer is thick.

To prevent blocking, a silicone high-performance powder may be added as necessary to the adhesive layer. The silicone high-performance powder can be dispersed in both organic solvent-type and aqueous-type adhesives. The average particle diameter of the silicone high-performance powder dispersed in the adhesive is 1 to 10 μm, most preferably 1 to 5 μm. A diameter of 10 μm or more causes the adhesive layer to be thick and the above effect is not brought about. On the other hand, a powder of 1 μm diameter is too fine to be well dispersed in the adhesive layer. Preferable examples of silicone high-performance powder include silicone type resin powder R-930, R-935, silicone type rubber powder E-605 (Toray Dowcorning Silicone Co., Ltd.). Usually, the amount of 1 to 10% silicone high-performance powder in the adhesive is sufficient, but this amount is not limiting.

In the present invention, the correction concealing layer consists of a white pigment such as titanium dioxide, magnesium carbonate, silica etc. and a polymeric resin serving as a binder, and these are not different from those conventionally used in correction tapes.

By using a ratio in thickness of the pressure-sensitive adhesive layer and the correction concealing layer in the range of 1:1 to 1:4, the adhesion of the tape onto a material to be corrected is rendered excellent and its transfer, concealing and writing properties can be improved. If the ratio in thickness of the pressure-sensitive adhesive layer and the correction concealing layer is less than the above range, concealing properties would be inferior, whereas at a ratio exceeding said range, the thickness of the resulting tape would be thick, the blocking phenomenon would occur, or a longer pressure-sensitive transfer correction tape could not be wound.

EXAMPLES AND COMPARATIVE EXAMPLES

Hereinafter, the present invention is described in detail with reference to Examples and Comparative Examples.

Examples 1 to 2 and Comparative Examples 1 to 3

A dispersion consisting of titanium oxide and a solvent was applied onto a polyester film substrate of 40 μm in thickness to form a correction concealing layer which was then provided thereon with a pressure-sensitive adhesive layer containing each of the concealing materials shown in Table 1. The thickness of each of the correction concealing layer and the pressure-sensitive adhesive layer was as shown in Table 1.

The resulting pressure-sensitive correction tape was measured for its blocking properties and concealing properties, and the result is shown in Table 2.

The blocking properties, degree of concealing, transfer cutting properties and deterioration with time shown in Table 2 were determined in the following manner.

Blocking properties: The pressure-sensitive transfer correction tape was fitted on a holder and examined in a 10-meter transfer test with a predetermined load on a high-grade paper to determine whether transfer failure by blocking occurs or not.

○: No transfer failure.
Δ: Transfer failure on 1 to 10 sites
X: Transfer failure on 10 or more sites.

Degree of concealing: Determined by a densitometer.

○: 95 to 100%, i.e. complete concealing.
Δ: 90 to 95%, i.e. slight concealing.
X: 90% or less, i.e. deleted characters are seen.

Transfer cutting properties:

○: Excellent cutting properties.
Δ: Cut while elongated.
X: Hardly cut.

Deterioration with time: The tape is stored at 40° C. for 1 hour and then evaluated whether it is normal or not.

TABLE 1

| | Concealing material added to pressure-sensitive layer | Thickness of pressure-sensitive layer | Thickness concealing layer | Ratio in thickness |
|---|---|---|---|---|
| Example 1 | titanium oxide | 5 μm | 20 μm | 1:4 |
| Example 2 | magnesium carbonate | 10 μm | 25 μm | 1:2.5 |
| Com. Ex. 1 | no additive | 5 μm | 20 μm | 1:4 |
| Com. Ex. 2 | silicone high-performance | 8 μm | 24 μm | 1:3 |
| Com. Ex. 3 | titanium oxide | 20 μm | 40 μm | 1:2 |

TABLE 2

| | Blocking properties | Concealing properties | Cutting properties | Deterioration with time |
|---|---|---|---|---|
| Example 1 | ○ | ○ | ○ | ○ |
| Example 2 | ○ | ○ | ○ | ○ |
| Com. Ex. 1 | Δ | x | Δ | x |
| Com. Ex. 2 | ○ | x | ○ | ○ |
| Com. Ex. 3 | Δ | ○ | x | ○ |

According to the present invention, a pressure-sensitive transfer correction tape being excellent in blocking properties, not generating any transfer failures and being free of deterioration with time in the concealing layer and the adhesive layer could be obtained by incorporating a concealing material into the pressure-sensitive adhesive layer and by setting a ratio in thickness of the pressure-sensitive adhesive layer and the correction concealing layer at the specific range.

What is claimed is:

1. A pressure-sensitive transfer correction tape comprising a correction concealing layer on one side of a sheet substrate and a pressure-sensitive adhesive layer containing a concealing material provided on the correction concealing layer, wherein the thickness in total of the pressure-sensitive adhesive layer and the correction concealing layer is 50 μm or less and wherein a ratio in thickness of the pressure-sensitive adhesive layer and the correction concealing layer is in the range of 1:2.5 to 1:4.

2. A pressure-sensitive transfer correction tape according to claim 1 wherein the concealing material is an inorganic material.

3. A pressure-sensitive transfer correction tape according to claim 1 wherein the concealing material is an organic material.

4. A pressure-sensitive transfer correction tape according to claim 2 wherein the concealing material is titanium oxide.

5. A pressure-sensitive transfer correction tape according to claim 4 wherein said titanium oxide has an average diameter of 5 μm or less.

* * * * *